United States Patent
Ding et al.

(10) Patent No.: US 10,732,968 B2
(45) Date of Patent: Aug. 4, 2020

(54) METHOD, APPARATUS AND SYSTEM FOR GENERATING AUGMENTED REALITY MODULE AND STORAGE MEDIUM

(71) Applicant: TENCENT TECHNOLOGY (SHENZHEN) COMPANY LIMITED, Shenzhen (CN)

(72) Inventors: Jian Ding, Shenzhen (CN); Xiao Liu, Shenzhen (CN); Hailong Liu, Shenzhen (CN); Bo Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/202,196

(22) Filed: Nov. 28, 2018

(65) Prior Publication Data
US 2019/0129715 A1     May 2, 2019

Related U.S. Application Data

(63) Continuation of application No. PCT/CN2017/092670, filed on Jul. 12, 2017.

(30) Foreign Application Priority Data

Jul. 18, 2016   (CN) .......................... 2016 1 0570848

(51) Int. Cl.
| | | |
|---|---|---|
| G06F 8/77 | (2018.01) | |
| G06F 9/00 | (2006.01) | |
| G06T 19/00 | (2011.01) | |
| H04L 29/08 | (2006.01) | |
| H04L 29/06 | (2006.01) | |

(52) U.S. Cl.
CPC .................. *G06F 8/77* (2013.01); *G06F 9/00* (2013.01); *G06T 19/006* (2013.01); *H04L 67/20* (2013.01); *H04L 67/38* (2013.01)

(58) Field of Classification Search
CPC . G06F 8/77; G06F 9/00; G06T 19/006; H04L 67/20; H04L 67/38
See application file for complete search history.

(56) References Cited

U.S. PATENT DOCUMENTS

| | | | | |
|---|---|---|---|---|
| 2014/0120887 A1* | 5/2014 | Huang | .................... | H04L 67/38 |
| | | | | 455/414.1 |
| 2015/0106767 A1* | 4/2015 | Abercrombie | .......... | G06F 3/013 |
| | | | | 715/848 |

(Continued)

FOREIGN PATENT DOCUMENTS

| | | |
|---|---|---|
| CN | 102739872 A | 10/2012 |
| CN | 102843349 A | 12/2012 |

(Continued)

OTHER PUBLICATIONS

International Search Report and Written Opinion of PCT/CN2017/092670.

(Continued)

*Primary Examiner* — Michael Le
(74) *Attorney, Agent, or Firm* — Oblon, McClelland, Maier & Neustadt, L.L.P.

(57) ABSTRACT

A method for generating an augmented reality module by an apparatus is described. Processing circuitry of the apparatus obtains preset third party software development interface information, the third party software development interface information being uniformly encapsulated with an AR core engine and an AR rendering engine, and a system parameter and pose information that are associated with the AR core engine being passed into the AR rendering engine. The processing circuitry generates, according to the third party software development interface information and a document configured corresponding to the third party software development interface information, an AR module of a mobile (Continued)

client, the correspondingly configured document comprising interface use information of the AR core engine and the AR rendering engine.

6 Claims, 5 Drawing Sheets

(56) References Cited

U.S. PATENT DOCUMENTS

2015/0356786 A1* 12/2015 Bare .................... G06T 19/006
                                                     345/633
2016/0019721 A1* 1/2016 Bare ...................... G01S 5/163
                                                     345/633
2016/0148433 A1* 5/2016 Petrovskaya ......... G06T 19/006
                                                     345/633
2018/0276899 A1* 9/2018 Liao ..................... G06T 19/006

FOREIGN PATENT DOCUMENTS

| CN | 105183477 A | 12/2015 |
|---|---|---|
| CN | 105338117 A | 2/2016 |

OTHER PUBLICATIONS

Office Action dated Jun. 28, 2018 in Chinese Application No. 201610570848.7 (partial English translation).

* cited by examiner

METHOD, APPARATUS AND SYSTEM FOR GENERATING AUGMENTED REALITY MODULE AND STORAGE MEDIUM

RELATED APPLICATION

This application is continuation of International Application No. PCT/CN2017/092670, filed on Jul. 12, 2017, which claims priority to Chinese Patent Application No. 201610570848.7, filed on Jul. 18, 2016. The entire disclosures of the prior applications are hereby incorporated by reference in their entirety.

FIELD OF THE TECHNOLOGY

The present disclosure relates to the field of computers, and in particular, to a method for generating an augmented reality module, an apparatus for generating an augmented reality module, a system for generating an augmented reality module, and a computer storage medium.

BACKGROUND OF THE DISCLOSURE

Augmented reality (AR) is a technology in which a position and an angle of an image of a camera are calculated in real-time, and a corresponding image, video and 3D (three dimensional) model are added. An object of the technology is to apply a virtual world to a real world on a screen, and to perform interaction. The technology was proposed in 1990. With an improvement of an operational capability of a CPU of a portable electronic product, the AR is more widely applied.

A block diagram of an architecture of an AR application development module based on a mobile client according to the related technology as shown in FIG. 1 mainly aims at a relatively professional AR developer or development user. Each AR module is developed by providing only an SDK (software development kit) of an AR core engine. The AR core engine includes some of the most basic technologies in the AR. After obtaining the SDK, the AR developer needs to select a suitable AR rendering engine by himself/herself. The difficulty is relatively great because each interface provided by a related rendering engine needs graphics basics of the developer. The developer needs to pass some system parameters and pose information obtained by the AR core engine into an AR rendering engine according to a particular requirement. From the standpoint of the development efficiency, it is not suitable to quickly develop an AR module in the AR application, and learning costs are relatively high.

SUMMARY

Embodiments of the present disclosure expect to provide a method for generating an augmented reality module, an apparatus for generating an augmented reality module and a computer storage medium, at least partially resolving the technical problem that in the related technology, the development efficiency of an AR application based on a mobile client is not high so that it is not suitable to quickly develop an AR module in the AR application, and learning costs are relatively high.

A first aspect of the embodiments of the present disclosure discloses a method implemented by an apparatus for generating an augmented reality (AR) module, comprising: obtaining, by processing circuitry of the apparatus, preset third party software development interface information, the third party software development interface information being uniformly encapsulated with an AR core engine and an AR rendering engine, and a system parameter and pose information that are associated with the AR core engine being passed into the AR rendering engine; and generating, by the processing circuitry, according to the third party software development interface information and a document configured corresponding to the third party software development interface information, an AR module of a mobile client, the correspondingly configured document comprising interface use information of the AR core engine and the AR rendering engine.

A second aspect of the present embodiments of the present disclosure discloses an apparatus for generating an augmented reality (AR) module, comprising: processing circuitry configured to obtain preset third party software development interface information, the third party software development interface information being uniformly encapsulated with an AR core engine and an AR rendering engine, and a system parameter and pose information that are associated with the AR core engine being passed into the AR rendering engine; and generate, according to the third party software development interface information and a document configured corresponding to the third party software development interface information, an AR module of a mobile client, the correspondingly configured document comprising interface use information of the AR core engine and the AR rendering engine.

A third aspect of the embodiments of the present disclosure discloses a system is for generating an augmented reality (AR) module, comprising: an AR mobile client; and a third party AR background service system, wherein the third party AR background service system is configured to provide an AR developer with background management services that comprise AR marker management, AR renderer management and AR marker identification, and the AR mobile client is configured to interact with the third party AR background service system during executing an AR application that comprises an AR module and to display a generated AR effect, the AR module is an AR module generated by the AR developer according to preset third party software development interface information that is used for developing an AR module of a mobile client and a document configured corresponding to the third party software development interface information, the third party software development interface information is uniformly encapsulated with an AR core engine and an AR rendering engine, a system parameter and pose information that are associated with the AR core engine are passed into the AR rendering engine, and the correspondingly configured document comprises interface use information of the AR core engine and the AR rendering engine.

A fourth aspect of the present embodiments of the disclosure discloses a non-transitory computer storage medium, the computer storage medium storing a computer executable instruction, and the computer executable instruction being used for performing the method according to the first aspect.

A fifth aspect of the present embodiments of the disclosure discloses a third party augmented reality AR background service system, comprising: one or more background servers; the background server comprising: a communications interface, configured to perform information interaction with an AR mobile client; and processing circuitry, connected to the communications interface, and configured to perform the method for generating an augmented reality module according to the first aspect.

During implementation of the embodiments of the present invention, software development interface information that is uniformly encapsulated with an AR core engine and an AR rendering engine in advance is provided so that the AR developer may develop the AR module of the mobile client directly according to the software development interface information, does not need to select the AR rendering engine by himself/herself, does not need to care some principles inside an AR, care how to use a parameter output by the AR core engine, how to load an AR renderer, or the like, thereby implementing that the AR application of the mobile client is quickly and easily developed, resolving the technical problem that in the related technology, the development efficiency of an AR application based on a mobile client is not high so that it is not suitable to quickly develop an AR module in the AR application, and learning costs are relatively high. This shortens a development period, simplifies a development process, thereby greatly reducing difficulty of developing an AR module.

BRIEF DESCRIPTION OF THE DRAWINGS

To describe the technical solutions in the embodiments of the present disclosure or in the related technology more clearly, the following briefly describes the accompanying drawings required for describing the embodiments or the related technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. It should be understood that exemplary embodiments described below are merely used to explain the present disclosure but are not intended to limit the present disclosure.

Figure 1:
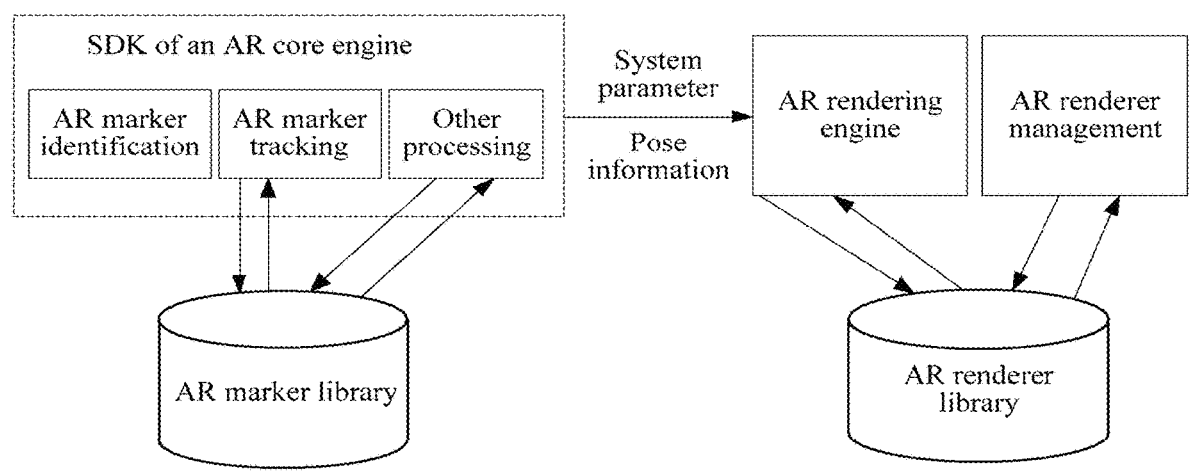
FIG. 1 is a block diagram of an architecture of an AR application development module based on a mobile client according to the related technology.
Figure 2:
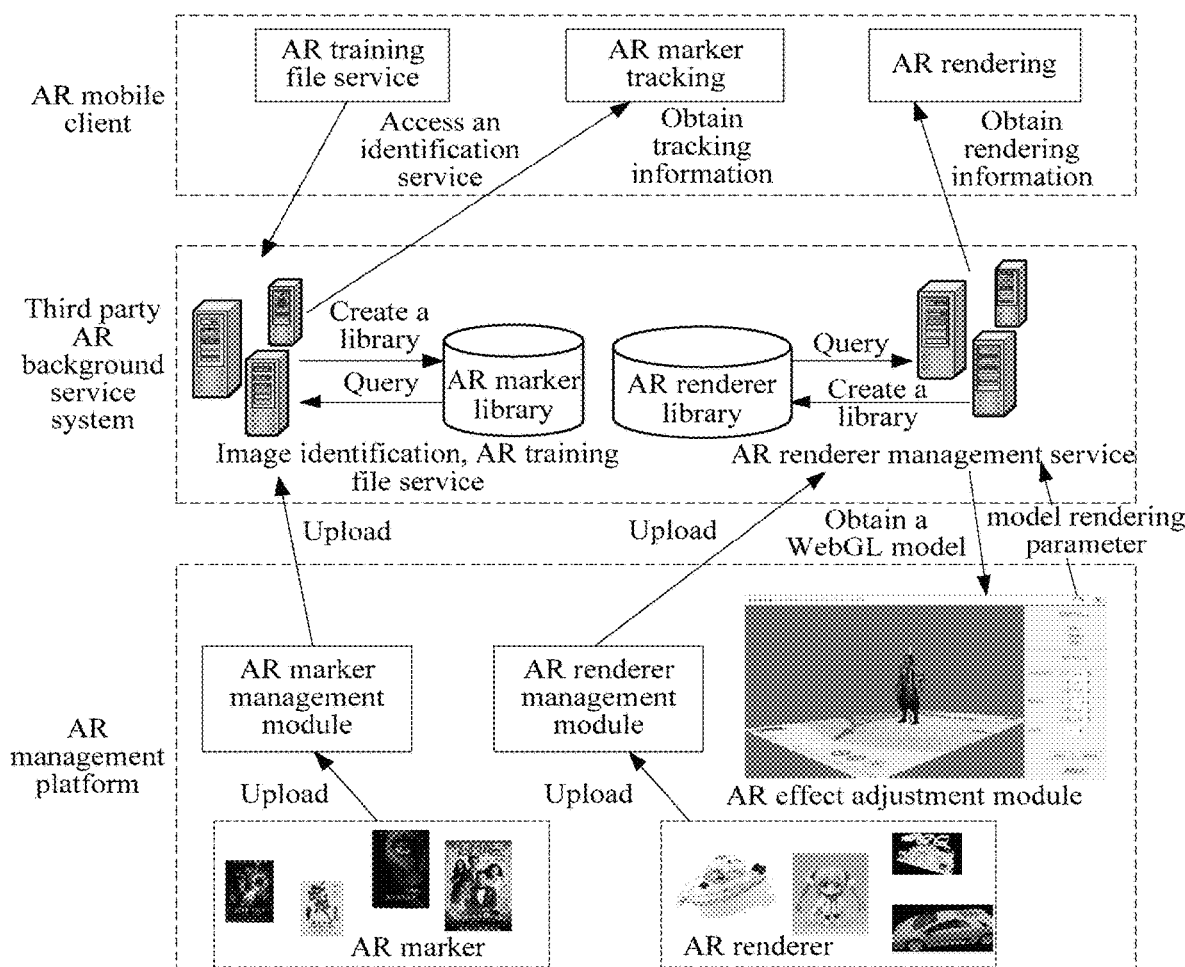
FIG. 2 is a schematic structural diagram of a system for generating an augmented reality module according to an embodiment of the present disclosure.

To better understand a method for generating an augmented reality module, an apparatus for generating an augmented reality module, and a system for generating an augmented reality module that are disclosed in the embodiments of the present disclosure, the following first describes the system for generating an augmented reality module provided in an embodiment of the present disclosure. Referring to FIG. 2, FIG. 2 is a schematic structural diagram of a system for generating an augmented reality module according to an embodiment of the present disclosure. As shown in FIG. 2, the system for generating an augmented reality module may include an AR mobile client and a third party AR background service system, where the third party AR background service system aims at an AR developer. The third party AR background service system may provide an AR developer with background management services that include AR marker management, AR renderer management and AR marker identification; the AR mobile client may be a mobile terminal that is mounted with and executes an AR application, that is, the AR application includes an AR module, the AR mobile client interacts with the third party AR background service system during executing the AR application that includes an AR module, obtains information of an AR rendering effect from the third party AR background service system, and finally displays a generated AR effect. It should be noted that an AR renderer in each embodiment of the present disclosure refers to a virtual object added in reality on a screen, and is an augment to a core of an AR, namely, an augment to reality. An AR marker refers to a scenario marker of a desired AR effect in the AR, and a position of the marker decides a position of the AR renderer; and an AR developer or a development user refers to a developer that develops an AR module in a mobile terminal application by using a development system of the AR application.

Optionally, the third party AR background service system provides the AR developer with a multifunctional background. This can satisfy a requirement of needing background management in use. Services stored by the AR marker and the AR renderer are used for background services (including image identification, an AR training file service, or the like) of AR marker identification, and services of AR renderer management (format conversion management, compression and AR renderer geometrical parameter management). thereby eliminating work of background maintenance using the AR developer. The system for generating an augmented reality module in the embodiment of the present disclosure may further include an AR management platform, and the AR management platform may include:

an AR marker management module, configured to manage AR marker image information uploaded by the AR developer, and to upload the AR marker image information to the third party AR background service system;

an AR renderer management module, configured to manage an AR renderer model file that is uploaded by the AR developer and that is corresponding to the AR marker image information, and to upload the AR renderer model file to the third party AR background service system, where the AR renderer model file herein may be configured to provide the AR renderer with an original rendering parameter, and the original rendering parameter may include: a relative positional relationship that is defined in advance and that is between the AR renderer and the AR marker, and the like; and an AR effect adjustment module, configured to receive an AR effect adjustment instruction input by the AR developer, to generate an adjusted AR rendering effect by using a real-time simulation of a pre-configured 3D rendering engine, and to upload adjusted rendering parameter information to the third party AR background service system to store and manage the adjusted rendering parameter information.

The adjusted rendering parameter information herein includes at least: a relative positional relationship between an adjusted AR renderer and AR marker.

In some embodiments, the original rendering parameter before being adjusted or the adjusted rendering parameter is not limited to the relative positional relationship between an AR renderer and an AR marker, and may further include: a rendering manner, and a rendering effect that needs to be achieved by rendering. The rendering effect may include: a 3D effect, a lamp-shade effect and/or a shadow effect.

Optionally, an AR management platform in each embodiment of the present disclosure may be an AR open platform website, the AR open platform web site may be a platform web site that is provided for the AR developer to manage the AR marker and the AR renderer and adjust the AR effect. The AR developer may log in to the AR open platform website, upload AR marker image information, an AR renderer model file that is corresponding to the AR marker image information, or the like that are required by the AR developer according to an requirement, and may check a simulated AR effect by invoking a 3D simulation display function of the AR open platform web site. The AR open platform web site may generate an AR rendering effect by using a simulation of a pre-configured 3D rendering engine. The AR developer may further adjust the AR effect on a 3D simulation interface provided by the AR open platform web site according to an requirement, and simulate the adjusted AR effect using the AR developer online in real-time. Therefore, the AR developer may perform only a simple uploading and online adjustment operation by using the AR management platform, so as to construct a desired AR module on a mobile client. The AR developer does not need to additionally learn related knowledge in an AR art. This further reduces difficulty of developing an AR module.

It should be noted that images of the AR marker and the AR render uploaded in FIG. 2 are only example, and do not limit the AR marker image information and the AR renderer model file that is corresponding to the AR marker image information.

It can be understood that a 3D rendering engine in each embodiment of the present disclosure includes, but is not limited to, a 3D rendering engine of Three.js, a native 3D engine of WebGL that is more basic, or the like. A background system that supports the AR management platform in each embodiment of the present disclosure may be set in a third party AR background service system, or may be an independent background system.

Figure 3:
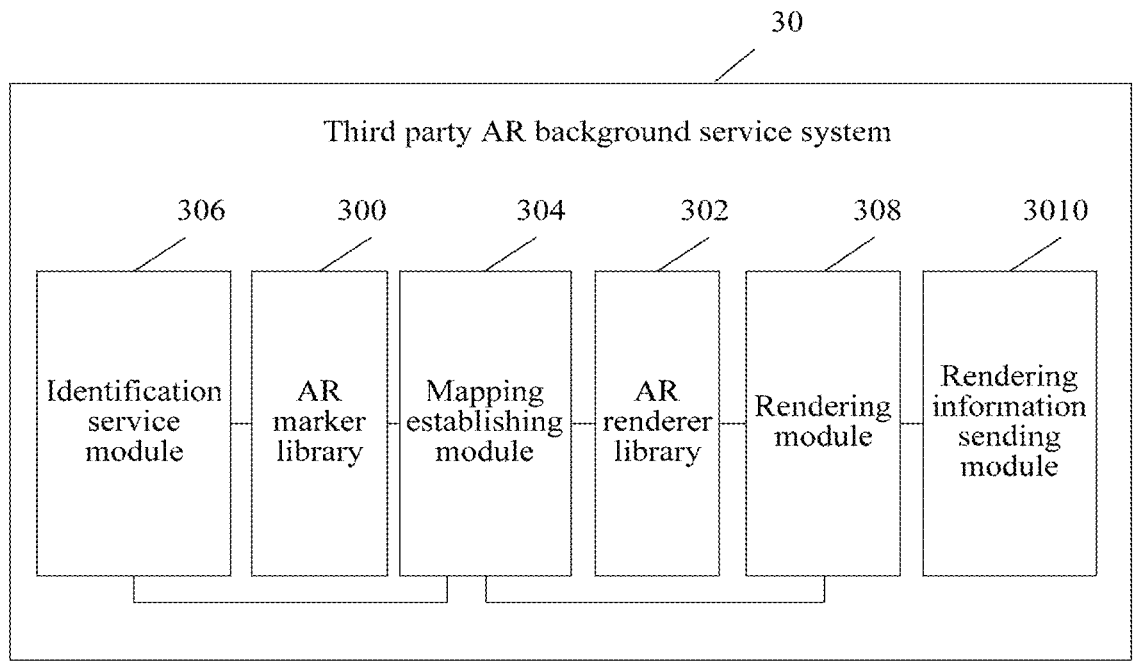
FIG. 3 is a schematic structural diagram of a third party AR background service system according to an embodiment of the present disclosure.

Optionally, as a schematic structural diagram of a third party AR background service system according to an embodiment of the present disclosure shown in FIG. 3, a third party AR background service system 30 may include: an AR marker library 300, an AR renderer library 302, a mapping establishing module 304, an identification service module 306, a rendering module 308 and a rendering information sending module 3010, where the AR marker library 300 is configured to store received AR marker image information;

the AR renderer library 302 is configured to store a received AR renderer model file that is corresponding to the AR marker image information;

the mapping establishing module 304 is configured to establish a mapping relationship between the AR marker image information and the AR renderer model file;

the identification service module 306 is configured to receive a request for access of an AR marker to an identification service sent by the AR mobile client, to perform image identification on the AR marker according to the AR marker image information stored in the AR marker library, to obtain tracking information of the AR marker, and to send the tracking information to the AR mobile client;

the rendering module 308 is configured to search for, according to the mapping relationship, an AR renderer model file that is corresponding to the AR marker, and to perform AR rendering by using the AR management platform; and the rendering information sending module 3010 is configured to send information of the AR rendering effect generated by the AR management platform to the AR mobile client. The AR mobile client may display, according to received information of the AR rendering effect, the AR rendering effect to a user.

Optionally, for an AR application scenario, in an aspect of data, the third party AR background service system 30 is mainly pre-configured with the AR marker library 300 and the AR renderer library 302. The AR marker library 300 includes an image library in which the AR development user wants to implement the AR effect. The AR renderer library 302 includes an AR renderer that the AR development user wants to present in the scenario. The embodiment of the present disclosure presets a background protocol according to an access principle provided in an SDK document of an AR core engine. The AR developer does not need to develop by himself/herself according a client protocol, thereby greatly shortening a development period. The third party AR background service system in the embodiment of the present disclosure establishes the identification service module 306 in advance according to development specifications of a marker identification module. The AR developer only needs to invoke the identification service module 306. Therefore, a background service provided by the third party AR background service system in the embodiment of the present disclosure is transparent to the AR developer, omitting work of the AR developer in an aspect of establishing the background service, further shortening a development period, and simplifying a development process.

Optionally, the AR module in the embodiment of the present disclosure is an AR module generated by the AR developer according to preset third party software development interface information that is used for developing an AR module of a mobile client and a document configured corresponding to the third party software development interface information, the third party software development interface information is uniformly encapsulated with an AR core engine and an AR rendering engine, a system parameter and pose information that are associated with the AR core engine are passed into the AR rendering engine, and the correspondingly configured document includes interface use information of the AR core engine and the AR rendering engine. That is, based on the interface use information, the AR developer may develop the AR module of the mobile client directly according to the software development interface information, does not need to select the AR rendering engine by himself/herself, does not need to care some principles inside an AR, care how to use a parameter output by the AR core engine, how to load an AR renderer, or the like, thereby implementing that the AR application of the mobile client is quickly and easily developed.

The interface use information includes: use guidance information of a software development interface. For example, the interface use information may be help information of using the interface provided by the AR developer. The software development interface may include: an SDK encapsulated with the AR core engine and the AR rendering engine.

In the embodiment of the present disclosure, the AR core engine may be position information that is used for identifying and tracking the AR marker and further obtaining an image capture device (for example, a camera) of each image in a video. The position information may include: a relative positional parameter that indicates a relative position of the image capture device to a capture object corresponding to the AR marker. The relative positional parameter may be used for determining a drawing position of the renderer in the image to the rendering engine. For example, the relative positional parameter may describe positions of the image capture device and the AR marker image information, and the drawing position of the AR renderer usually needs to be determined according to the AR marker. If the relative positional parameter of the image capture device and the capture object corresponding to the AR marker is known, the AR renderer can be superposed, according to the relative positional parameter, on or around the AR marker.

The AR rendering engine may be a component that performs image rendering on the renderer in the image. The image rendering may include: image coloring. The image presents a specific image effect by coloring, for example, a light effect, a shadow effect, a texture effect, a 3D effect, or a material effect.

The system parameter may include: a hardware parameter of the image collection device, for example, a focal length in a camera, size parameters of various sensors, spacings between multiple prisms in a prism combination, a thickness of a prism combination, and a camera distortion parameter. The system parameter and the relative positional parameter of the camera together decide a position of the AR marker in the image, thereby deciding a position of the AR renderer drawn in the AR marker in the image. The sensor may include: a light-sensitive sensor, and the like.

Figure 4:
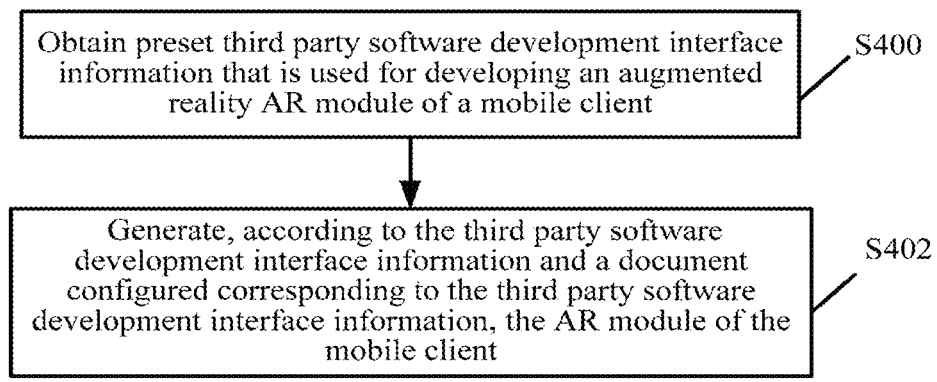
FIG. 4 is a schematic diagram of a process of a method for generating an augmented reality module according to an embodiment of the present disclosure.

The following describes how an AR developer develops an AR module and generates the AR module with reference to a schematic diagram of a process of a method for generating an augmented reality module according to an embodiment of the present disclosure shown in FIG. 4, including the steps described below.

Step S400 includes obtaining preset third party software development interface information that is used for developing an augmented reality AR module of a mobile client.

Optionally, the third party software development interface information is uniformly encapsulated with an AR core engine and an AR rendering engine, a system parameter and pose information that are associated with the AR core engine are passed into the AR rendering engine, thereby providing a uniform and simple interface for the AR developer to use. The AR developer does not need to care how to select a suitable rendering engine, and only needs to merge the interface information into his/her own application (App) according to a requirement of a development document. The third party software development interface information in the embodiment of the present disclosure includes, but is not limited to, a third party SDK. It should be noted that in an aspect of encapsulation of the mobile client, different SDK interfaces of the mobile client may alternatively be encapsulated for AR developer with different levels. Some relatively complicated interfaces are reserved for relatively professional AR users. This does not affect a whole effect, and improves flexibility of AR application development.

Step S402 includes generating, according to the third party software, development interface information and a document configured corresponding to the third party software development interface information, the AR module of the mobile client.

The simple interface may be: an SDK encapsulated with the AR core engine and the AR rendering engine, the interface is associated with the encapsulated AR core engine and AR rendering engine and may be directly connected to the APP to use. Therefore, the simple interface may alternatively be referred to as a direct application interface.

The complicated interface may be an SDK encapsulated with one or more AR core engines and/or one or more AR rendering engines that are associated with the AR core engines. That is, the AR core engines and the AR rendering engines that are encapsulated in the complicated interface are not separate or associated. An AR developer needs to select which AR core engine and which AR rendering engine to be associated by himself/herself. Therefore, the complicated interface in this embodiment may alternatively be referred to as a to-be-configured interface. During application, the AR developer needs to select a corresponding AR core engine and AR rendering engine according to his/her own requirement, and to associate the selected AR core engine and AR rendering engine. In this embodiment, that the AR core engine and the AR rendering engine are associated represents connection between the AR core engine and the AR rendering engine has been established. The AR core engine leads the system parameter, the pose information, and so on to the AR rendering engine associated with the AR core engine during subsequent application.

Optionally, the correspondingly configured document in the embodiment of the present disclosure includes interface use information of the AR core engine and the AR rendering engine. The generated AR module may be added to an existing application. That is, the application is updated and upgraded to generate an AR application including the AR module, and a new AR application may alternatively be directly generated according to the generated AR module. The AR application performs interaction with a preset third party AR background service system during execution. That is, the AR application installs an installation package of the AR application and executes a mobile terminal of the AR application to interact with the preset third party AR background service system, to obtain and display a real-time AR rendering effect. The third party AR background service system provides background management services that include AR marker management, AR renderer management and AR marker identification.

Optionally, the method for generating an augmented reality module in the embodiment of the present disclosure may further include: receiving a login instruction, and logging in to a preset AR management platform; and uploading, based on the AR management platform, AR marker image information and/or an AR renderer model file that is corresponding to the AR marker image information to the third party AR background service system.

Optionally, the AR developer may register an account on the preset AR management platform, and then input a login instruction on an electronic terminal. Then login instruction may include information such as the registered account and a login password. The AR developer logs in to the AR management platform by using the registered account. The AR developer may upload AR marker image information and an AR renderer model file that is corresponding to the AR marker image information that are required by the AR developer, or the like on the AR management platform by using the electronic terminal according to an requirement. The AR management platform may send the uploaded information to the third party AR background service system, to store and manage the information.

Optionally, the method for generating an augmented reality module in the embodiment of the present disclosure may further include: receiving a login instruction, and logging in to a preset AR management platform; receiving an AR effect adjustment instruction input based on the AR management platform; generating, according to the AR effect adjustment instruction, an adjusted AR rendering effect by using a real-time simulation of a pre-configured 3D rendering engine; and uploading adjusted rendering parameter information to the third party AR background service system to store and manage the adjusted rendering parameter information.

Optionally, after the AR developer logs in to the AR management platform by using the registered account, the AR developer may input the AR effect adjustment instruction on a 3D simulation interface provided by the AR open platform website. Actually, after the electronic terminal receives the AR effect adjustment instruction input by the AR developer based on the AR management platform, the AR management platform simulates, according to the AR effect adjustment instruction, an AR rendering effect in real-time by using the pre-configured 3D rendering engine, and returns the effect information to the electronic terminal. The electronic terminal may display the adjusted AR rendering effect in real-time by using a display. In addition, the AR management platform uploads the adjusted rendering parameter information to the third party AR background service system to store and manage the adjusted rendering parameter information.

Therefore, the AR developer may perform only a simple uploading and online adjustment operation by using the AR management platform, so as to construct a desired AR module on a mobile client. The AR developer does not need to additionally learn related knowledge in an AR art. This further reduces difficulty of developing an AR module.

It should be noted that the third party software development interface information in the embodiment of the present disclosure may be uniformly encapsulated with multiple sets of AR core engines and AR rendering engines corresponding to the multiple sets of AR core engines, and AR rendering engines in each set are different.

Developing the AR module of the mobile client according to the third party software development interface information in step S402 may include: selecting a set of AR core engines and AR rendering engines corresponding to the set of AR core engines from the multiple sets of AR core engines and the AR rendering engines corresponding to the multiple sets of AR core engines; and generating, according to the selected AR core engines and AR rendering engines, and the correspondingly configured document, the AR module of the mobile client. Therefore, the AR developer may also select different pre-configured AR rendering engines according to his/her own requirement, thereby satisfying an requirement that different AR developers select different AR rendering engines, and further improving flexibility and convenience of AR application development.

During implementation of the embodiments of the present disclosure, software development interface information that is uniformly encapsulated with an AR core engine and an AR rendering engine in advance is provided so that the AR developer may develop the AR module of the mobile client directly according to the software development interface information, does not need to select the AR rendering engine by himself/herself, does not need to care some principles inside an AR, care how to use a parameter output by the AR core engine, how to load an AR renderer, or the like, thereby implementing that the AR application of the mobile client is quickly and easily developed, resolving the technical problem that in the related technology, the development efficiency of an AR application based on a mobile client is not high so that it is not suitable to quickly develop an AR module in the AR application, and learning costs are relatively high. This shortens a development period, simplifies a development process, thereby greatly reducing difficulty of developing an AR module. In addition, a background service provided by the third party AR background service system in the embodiment of the present disclosure is transparent to the AR developer, omitting work of the AR developer in an aspect of establishing the background service, further shortening a development period, and simplifying a development process. The AR developer may perform only a simple uploading and online adjustment operation by using the AR management platform, so as to construct a desired AR module on a mobile client. The AR developer does not need to additionally learn related knowledge in an AR art. This further reduces difficulty of developing an AR module.

Figure 5:
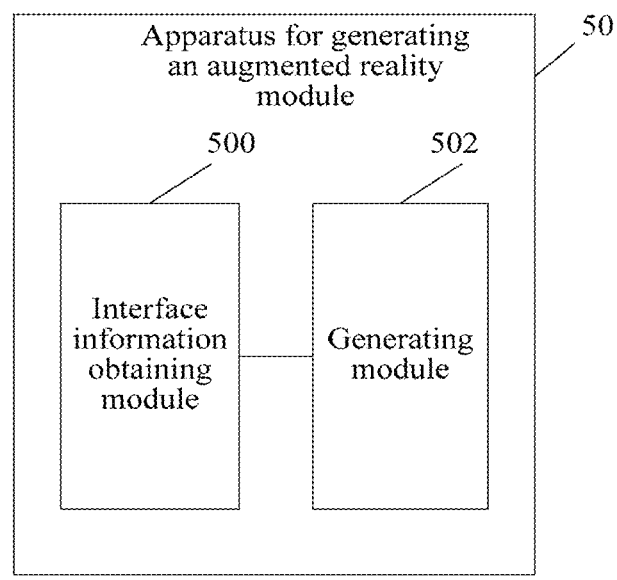
FIG. 5 is a schematic structural diagram of an apparatus for generating an augmented reality module according to an embodiment of the present disclosure.

To better implement the foregoing solution of the embodiment of the present disclosure, the present disclosure further correspondingly provides an apparatus for generating an augmented reality module. As a schematic structural diagram of an apparatus for generating an augmented reality module according to an embodiment of the present disclosure shown in FIG. 5, an apparatus 50 for generating an augmented reality module may include: an interface information obtaining module 500 and a generating module 502, where the interface information obtaining module 500 is configured to obtain preset third party software development interface information that is used for developing an augmented reality AR module of a mobile client, the third party software development interface information is uniformly encapsulated with an AR core engine and an AR rendering engine, and a system parameter and pose information that are associated with the AR core engine are passed into the AR rendering engine; and the generating module 502 is configured to generate, according to the third party software development interface information and a document configured corresponding to the third party software development interface information, the AR module of the mobile client, and the correspondingly configured document includes interface use information of the AR core engine and the AR rendering engine.

Optionally, the AR application performs interaction with a preset third party AR background service system during execution. The third party AR background service system provides background management services that include AR marker management, AR renderer management and AR marker identification.

Figure 6:
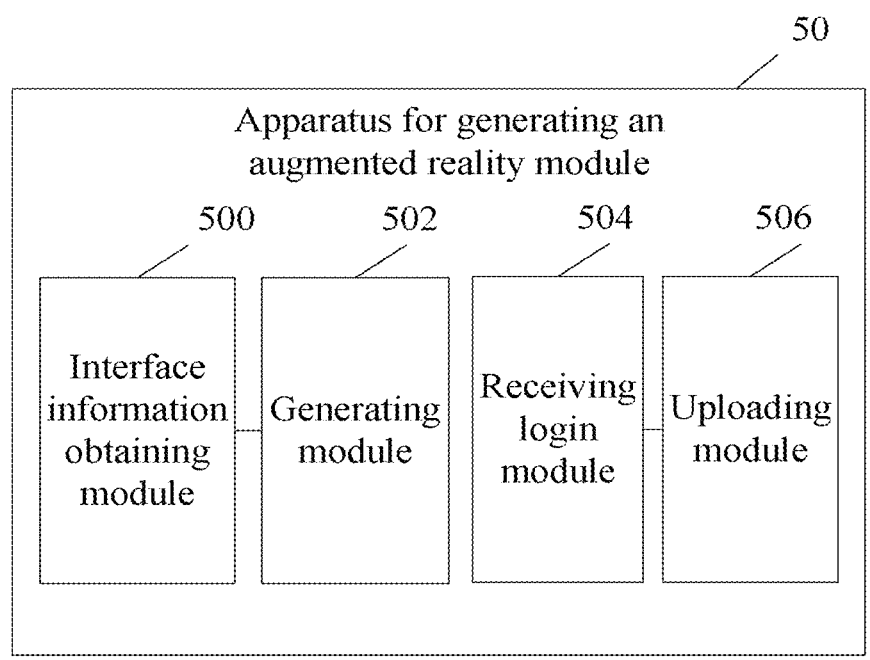
FIG. 6 is a schematic structural diagram of an apparatus for generating an augmented reality module according to another embodiment of the present disclosure.

Optionally, as a schematic structural diagram of an apparatus for generating an augmented reality module according to another embodiment of the present disclosure shown in FIG. 6, an apparatus 50 for generating an augmented reality module includes an interface information obtaining module 500 and a generating module 502, and may further include a receiving login module 504 and an uploading module 506, where the receiving login module 504 is configured to receive a login instruction, and to log in to a preset AR management platform; and the uploading module 506 is configured to upload, based on the AR management platform, AR marker image information and an AR renderer model file corresponding to the AR marker image information to a preset third party AR background service system, the third party AR background service system provides background management services that include AR marker management, AR renderer management and AR marker identification.

Figure 7:
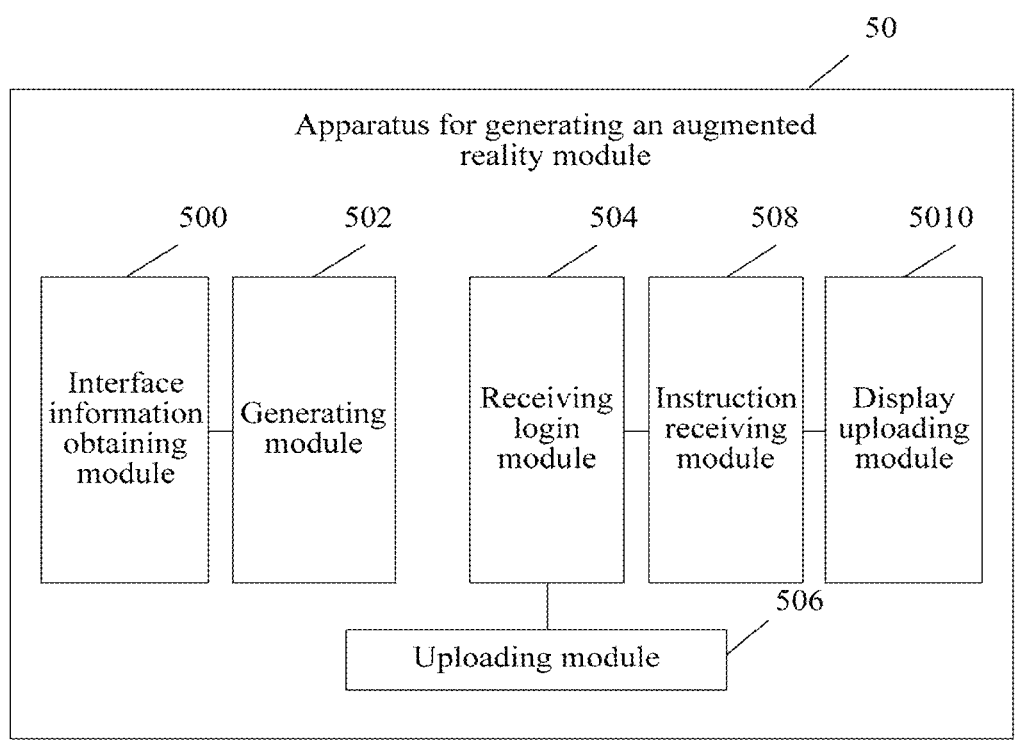
FIG. 7 is a schematic structural diagram of an apparatus for generating an augmented reality module according to another embodiment of the present disclosure.

Optionally, as a schematic structural diagram of an apparatus for generating an augmented reality module according to another embodiment of the present disclosure shown in FIG. 7, an apparatus 50 for generating an augmented reality module includes an interface information obtaining module 500, a generating module 502, a receiving login module 504 and an uploading module 506, and may further include an instruction receiving module 508 and a display uploading module 5010, where the instruction receiving module 508 is configured to receive an AR effect adjustment instruction input based on the AR management platform after the receiving login module 504 receives the login instruction, and logs in to the preset AR management platform; and the display uploading module 5010 is configured to display, according to the AR effect adjustment instruction, an adjusted AR rendering effect by using a real-time simulation of a pre-configured 3D rendering engine, and to upload adjusted rendering parameter information to the third party AR background service system to store and manage the adjusted rendering parameter information.

The rendering parameter information may include: an AR renderer and a relative positional parameter of an AR marker.

Optionally, the third party software development interface information may be uniformly encapsulated with multiple sets of AR core engines and AR rendering engines corresponding to the multiple sets of AR core engines, and AR rendering engines in each set are different.

The generating module 502 is further configured to select a set of AR core engines and AR rendering engines corresponding to the set of AR core engines from the multiple sets of AR core engines and the AR rendering engines corresponding to the multiple sets of AR core engines; and to generate, according to the selected AR core engines and AR rendering engines, and the correspondingly configured document, the AR module of the mobile client. The configured document herein further stores: information such as identification of the AR marker, a name of a renderer corresponding to the AR marker, and a relative positional relationship of a preset AR marker and AR renderer. Information such as the relative positional relationship of the preset AR marker and AR renderer is used for indicating relative positions of the AR renderer and the AR marker in an image.

It should be noted that the apparatus 50 for generating an augmented reality module in the embodiment of the present disclosure may include, but is not limited to, a device that may develop an application program, for example, a personal computer or a tablet computer. A function of each functional module of the apparatus 50 for generating an augmented reality module may be specifically implemented according to the method in the foregoing method embodiment. For a specific implementation process, reference may be made to related descriptions to the foregoing method embodiment, and details are not described herein again.

In conclusion, during implementation of the embodiments of the present disclosure, software development interface information that is uniformly encapsulated with an AR core engine and an AR rendering engine in advance is provided so that the AR developer may develop the AR module of the mobile client directly according to the software development interface information, does not need to select the AR rendering engine by himself/herself, does not need to care some principles inside an AR, care how to use a parameter output by the AR core engine, how to load an AR renderer, or the like, thereby implementing that the AR application of the mobile client is quickly and easily developed, resolving the technical problem that in the related technology, the development efficiency of an AR application based on a mobile client is not high so that it is not suitable to quickly develop an AR module in the AR application, and learning costs are relatively high. This shortens a development period, simplifies a development process, thereby greatly reducing difficulty of developing an AR module. In addition, a background service provided by the third party AR background service system in the embodiment of the present disclosure is transparent to the AR developer, omitting work of the AR developer in an aspect of establishing the background service, further shortening a development period, and simplifying a development process. The AR developer may perform only a simple uploading and online adjustment operation by using the AR management platform, so as to construct a desired AR module on a mobile client. The AR developer does not need to additionally learn related knowledge in an AR art. This further reduces difficulty of developing an AR module.

An embodiment of the present disclosure further provides a third party AR background service system, including one or more background servers. When the third party AR background service system includes multiple background servers, the background servers are usually connected to each other to form a computer cluster.

The background server may include:
a communications interface, configured to perform information interaction with an AR mobile client; and
a processor, connected to the communications interface, and configured to perform the foregoing method for generating an augmented reality module provided by one or more technical solutions.

The communications interface may be an Internet interface, and may be configured to perform information interaction with an AR mobile client, for example, obtaining the foregoing third party software development interface information, providing the configured document, or the like. The communications interface may be a wired interface, such as an optical cable interface or a cable interface. The third party AR background service system may be connected to the AR mobile client by using internet. In some embodiments, the communications interface may alternatively be a wireless interface.

The processor may be various types of processors, such as a central processing unit, a microprocessor, a digital signal processor, a programmable array, an application processor, or an application-specific integrated circuit, all of which are examples of processing circuitry.

The processor may obtain the foregoing third party software development interface information from the AR mobile client and provide the AR mobile client with the configured document by using a computer executable instruction such as a computer program, and assist the AR mobile client in generating an AR module, to simplify generating of the AR module of the AR mobile client.

The processor may be connected to the communications interface by using a bus interface such as an integrated circuit bus, to facilitate the processor controlling information interaction between the communications interface and the AR mobile client.

In this embodiment, the AR mobile client may include: a wireless interface and a processor. The wireless interface may be configured to connect the AR mobile client and the third party AR background service system, to perform information interaction. The processor in the AR mobile client may similarly be connected to the wireless interface by using the bus interface in the AR mobile client, may be configured in a configured document provided based on a third party AR background server and so on, and generate the AR module in the AR mobile client.

In the several embodiments provided in this application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, functional units in the embodiments of the present disclosure may be all integrated in a processing module, each unit is separately used as a unit, or two or more units are integrated in a unit. The integrated unit may be implemented in a form of hardware, or may be implemented in form of hardware plus a software functional unit.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disk.

Alternatively, when the integrated unit of the present disclosure is implemented in a form of a software functional module and sold or used as an independent product, the integrated unit may be stored in a computer-readable storage medium. Based on such an understanding, the technical solutions of the embodiments of the present disclosure essentially, or the part contributing to the related technology may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: various types of media that may store program code, for example, a mobile storage device, a ROM, a magnetic disk, or an optical disk.

The foregoing disclosed embodiments are merely exemplary embodiments of the present disclosure, and certainly are not used for limiting the scope of the claims of the present disclosure. Any modification made according to the principle of the present disclosure shall fall within the protection scope of the present disclosure.

INDUSTRIAL PRACTICABILITY

In the technical solutions provided in the embodiments of the present disclosure, the third party software development interface information is encapsulated with the AR core engine and the AR rendering engine. In this way, when third party software develops the AR module in the AR application, the third party software does not need to develop an AR rendering engine matched with the AR core engine, thereby reducing difficulty of developing by a third party, shortening a development period of the AR module, improving the development efficiency of the AR module, and having a positive industrial effect. The technical solutions provided by the embodiments of the present disclosure provide the third party software development interface information developed by the AR module, and directly provide the AR core engine and the AR rendering engine together. This has a feature of simple implementation in industry.

What is claimed is:

1. A method implemented by an apparatus for generating an augmented reality (AR) module, comprising:
    obtaining, by processing circuitry of the apparatus, preset third party software development interface information from a third party AR background service system, the third party software development interface information being uniformly encapsulated with an AR core engine and an AR rendering engine, and a system parameter and pose information that are associated with the AR core engine being passed into the AR rendering engine; and
    generating, by the processing circuitry, according to the third party software development interface information and a document configured corresponding to the third party software development interface information, an AR module of a mobile client that communicates with the third party AR background service system, the correspondingly configured document comprising interface use information of the AR core engine and the AR rendering engine,
    wherein the third party software development interface information is uniformly encapsulated with multiple sets of AR core engines and AR rendering engines corresponding to the multiple sets of AR core engines, and AR rendering engines in each set are different; and
    the generating includes:
    selecting, by the processing circuitry, a set of AR core engines and AR rendering engines corresponding to the set of AR core engines from the multiple sets of AR core engines and the AR rendering engines corresponding to the multiple sets of AR core engines; and
    generating, by the processing circuitry, according to the selected AR core engines and AR rendering engines, and the correspondingly configured document, the AR module of the mobile client, the method further comprising:
receiving, by the processing circuitry, a login instruction, and logging in to an AR management platform; and
uploading, by the processing circuitry, based on the AR management platform, AR marker image information and an AR renderer model file corresponding to the AR marker image information to a preset third party AR background service system, the third party AR background service system providing background management services that comprise AR marker management, AR renderer management and AR marker identification,
wherein the receiving the login instruction, and logging in to the AR management platform further comprises:
receiving, by the processing circuitry, an AR effect adjustment instruction input based on the AR management platform; and
generating, by the processing circuitry, according to the AR effect adjustment instruction, an adjusted AR rendering effect by using a real-time simulation of a pre-configured 3D rendering engine, and uploading adjusted rendering parameter information to the third party AR background service system to store and manage the adjusted rendering parameter information.

2. A non-transitory computer storage medium, the computer storage medium storing a computer executable instruction, and the computer executable instruction being used for performing the method according to claim 1.

3. A system for generating an augmented reality (AR) module, comprising:
an AR developer apparatus that includes processing circuitry;
an AR mobile client that includes processing circuitry; and
a third party AR background service system that includes processing circuitry and which communicates with each of the AR developer apparatus and the AR mobile client,
wherein
the third party AR background service system is configured to provide the AR developer apparatus with background management services that comprise AR marker management, AR renderer management and AR marker identification, and
the AR mobile client is configured to interact with the third party AR background service system during executing an AR application that comprises the AR module and to display a generated AR effect, the AR module is an AR module generated by the AR developer apparatus according to preset third party software development interface information that is used for developing an AR module of a mobile client and a document configured corresponding to the third party software development interface information, the third party software development interface information is uniformly encapsulated with an AR core engine and an AR rendering engine, a system parameter and pose information that are associated with the AR core engine are passed into the AR rendering engine, and the correspondingly configured document comprises interface use information of the AR core engine and the AR rendering engine,
wherein the third party software development interface information is uniformly encapsulated with multiple sets of AR core engines and AR rendering engines corresponding to the multiple sets of AR core engines, and AR rendering engines in each set are different; and
the AR developer apparatus is configured to select a set of AR core engines and AR rendering engines corresponding to the set of AR core engines from the multiple sets of AR core engines and the AR rendering engines corresponding to the multiple sets of AR core engines; and to generate, according to the selected AR core engines and AR rendering engines, and the correspondingly configured document, the AR module of the mobile client,
the system further comprising:
an AR management platform, the AR management platform comprising:
processing circuitry configured to
manage AR marker image information uploaded by the AR developer apparatus, and upload the AR marker image information to the third party AR background service system; and
manage an AR renderer model file that is uploaded by the AR developer apparatus and that is corresponding to the AR marker image information, and upload the AR renderer model file to the third party AR background service system,
wherein the processing circuitry is configured to receive an AR effect adjustment instruction input by the AR developer apparatus, generate an adjusted AR rendering effect by using a real-time simulation of a pre-configured 3D rendering engine, and upload adjusted rendering parameter information to the third party AR background service system to store and manage the adjusted rendering parameter information.

4. The system according to claim 3, wherein the third party AR background service system comprises:
an AR marker memory, configured to store received AR marker image information;
an AR renderer memory, configured to store a received AR renderer model file that is corresponding to the AR marker image information; and
processing circuitry configured to establish a mapping relationship between the AR marker image information and the AR renderer model file.

5. The system according to claim 4, wherein the processing circuitry of the third party AR background service system is configured to
receive a request for access of an AR marker to an identification service sent by the AR mobile client, to perform image identification on the AR marker according to the AR marker image information stored in the AR marker memory, to obtain tracking information of the AR marker, and to send the tracking information to the AR mobile client;
search for, according to the mapping relationship, an AR renderer model file that is corresponding to the AR marker, and to perform AR rendering by using the AR management platform; and
send information of the AR rendering effect generated by the AR management platform to the AR mobile client.

6. An apparatus for generating an augmented reality (AR) module, comprising:
processing circuitry configured to
obtain preset third party software development interface information from a third party AR background service system, the third party software development interface information being uniformly encapsulated with an AR core engine and an AR rendering engine, and a system parameter and pose information that are associated with the AR core engine being passed into the AR rendering engine; and generate, according to the third party software development interface information and a document configured corresponding to the third party software development interface information, an AR module of a mobile client that communicates with the third party AR background service system, the correspondingly configured document comprising interface use information of the AR core engine and the AR rendering engine, wherein the third party software development interface information is uniformly encapsulated with multiple sets of AR core engines and AR rendering engines corresponding to the multiple sets of AR core engines, and AR rendering engines in each set are different; and the processing circuitry is configured to select a set of AR core engines and AR rendering engines corresponding to the set of AR core engines from the multiple sets of AR core engines and the AR rendering engines corresponding to the multiple sets of AR core engines; and to generate, according to the selected AR core engines and AR rendering engines, and the correspondingly configured document, the AR module of the mobile client, the processing circuitry being further configured to:

receive a login instruction, and to log in to an AR management platform;

upload, based on the AR management platform, AR marker image information and an AR renderer model file corresponding to the AR marker image information to a preset third party AR background service system, the third party AR background service system providing background management services that comprise AR marker management, AR renderer management and AR marker identification;

receive an AR effect adjustment instruction input based on the AR management platform after the processing circuitry receives the login instruction and logs in to the AR management platform; and generate, according to the AR effect adjustment instruction, an adjusted AR rendering effect by using a real-time simulation of a pre-configured 3D rendering engine, and upload adjusted rendering parameter information to the third party AR background service system to store and manage the adjusted rendering parameter information.

* * * * *